United States Patent
Fridman et al.

[15] 3,691,885
[45] Sept. 19, 1972

[54] DEVICE FOR CUTTING ELASTIC BAR STOCK INTO SPECIFIED LENGTHS

[72] Inventors: Uriel Grigorievich Fridman, Gera Sergeevna Mor, Rolands Bernkhardovich Skadynsh, Ivan Emelyanovich Kuzmenko, all of Riga, U.S.S.R.

[73] Assignee: Spetsialnoe Konstruktorskoe bjuro Khimizatsui, narodnogo khozaistra Latriiskoi SSR USSR

[22] Filed: Jan. 19, 1971

[21] Appl. No.: 107,710

[52] U.S. Cl. .................. 82/75, 82/101, 82/2.5
[51] Int. Cl. .................. B23b 3/04, B23b 5/14
[58] Field of Search......... 82/46, 55, 70.2, 72, 73, 74, 82/75, 76, 101, 102, 2.5, 2.7

[56] References Cited

UNITED STATES PATENTS

| | | | |
|---|---|---|---|
| 2,186,061 | 1/1940 | Berg et al | 82/75 X |
| 2,343,914 | 3/1944 | Lloyd | 82/2.5 |
| 2,619,174 | 11/1952 | Neale | 82/75 X |
| 2,894,582 | 7/1959 | Loud | 82/75 X |
| 3,613,489 | 10/1971 | Raudich | 82/101 X |

Primary Examiner—Harrison L. Hinson
Attorney—Holman & Stern

[57] ABSTRACT

A device for cutting elastic bar stock into specified lengths comprising a cutting mechanism whose cutting moves around the bar stock to be cut and reciprocates towards its center, and a feed mechanism. The feed mechanism comprises a guide mandrel with a hole for the bar stock and two grips for said stock, one of the grips being installed immovably relative to said guide mandrel while the other grip can move in the direction of feed. The grips are formed by cantilever-mounted spring plates whose free ends clamp the bar stock, said plates being directed at an acute angle to the bar stock which ensures self-locking of the stock in the direction opposite to its feed.

3 Claims, 5 Drawing Figures

PATENTED SEP 19 1972 3,691,885

DEVICE FOR CUTTING ELASTIC BAR STOCK INTO SPECIFIED LENGTHS

The present invention relates to the devices for cutting elastic bar stock into specified lengths and can be used for making various articles from this material, e.g., rubber and plastic sealing gaskets for valves.

Known in the art is a device for cutting elastic bar stock into specified lengths comprising a cutting mechanism whose cutter has a drive for moving it around the axis of the bar stock to be cut and reciprocating it towards the center of said stock, and a feed mechanism having a guide bushing for the passage of the bar stock, said bushing being provided with longitudinal cutouts. Installed in the longitudinal cutouts of the guide bushing are shoes which are set in compound motion by a drive consisting of cams and a system of levers. The shoes move radially towards the center of the bar stock located inside the bushing and clamp it; then they move together with the bar one step in the direction of cutting feed. Then a length of the bar is cut off and the shoes are withdrawn radially from the bar, moving to the initial position against the direction of feed.

While the bar stock is not clamped by the shoes, it lies freely in the guide bushing; as a result, the bar may be displaced which impairs the accuracy of the dimensions of the cut-off articles.

The known device has a complicated design of the shoe drive which fails to ensure high accuracy in adjusting the feed travel. Besides, the known device can be used only for cutting the bar stock of round section.

An object of the invention is to provide a device for cutting elastic bar stock into specified lengths whose drive mechanism, being simple in design, would ensure high accuracy of feed and permit handling the bar stock of any cross section.

This object is accomplished by providing a device for cutting elastic bar stock into specified lengths in which, according to the invention, the feed mechanism comprises a guide mandrel with a hole for the fed material and two self-locking grips formed, each, by a system of cantilever-mounted spring plates whose free ends are intended to clamp the bar stock while the plates are arranged at an acute angle to the bar, this angle ensuring self-locking of the bar stock in the direction against the feed, one of said grips being secured immovably with relation to the guide mandrel while the other one is movable and has a drive for reciprocating it in the direction of feed.

It is practicable that the plates of the movable grip should be located after the plates of the fixed grip in the direction of movement of the bar stock.

The drive which reciprocates the movable grip in the direction of feed should preferably be provided with a regulator of the movable grip travel.

Now the invention will be described in detail by way of example with reference to the accompanying drawings, in which.

Figure 2A:
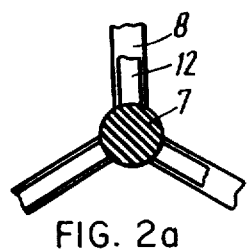
FIG. 2a–2d shows the position of the spring plates of the movable and fixed grips in the device, according to the invention, for some profiles of elastic bar stock subject to cutting.
Figure 2B:
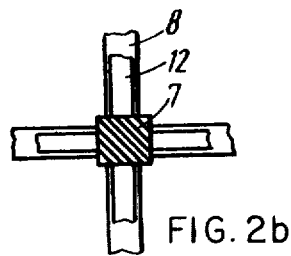
Figure 2C:
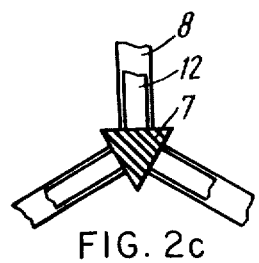
Figure 2D:
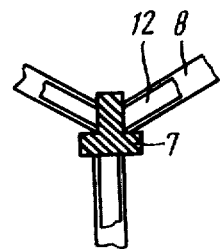
Figure 1:
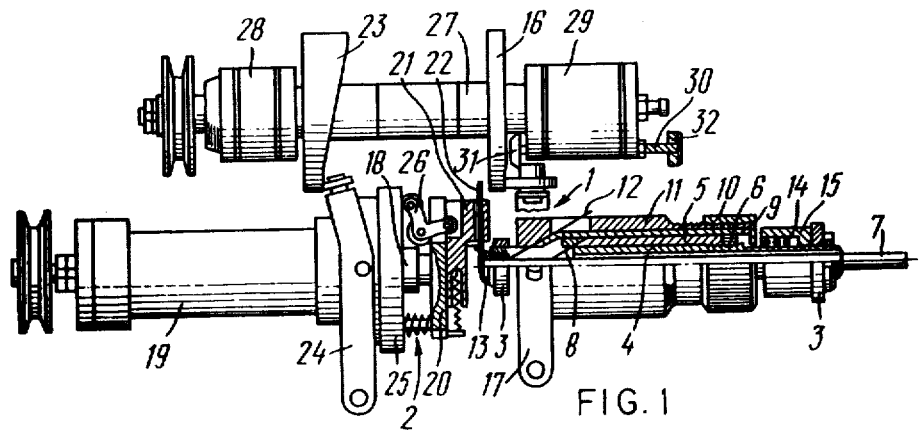
FIG. 1 is a plan view, partly cut away, of the device for cutting elastic bar stock into specified lengths, according to the invention.

The device for cutting elastic bar stock into specified lengths comprises two basic mechanisms, viz., a feed mechanism 1 and a cutting mechanism 2.

The feed mechanism 1 comprises a guide mandrel 4 installed on supports 3 and carrying a bushing 5 which by a nut 6; said plates are clamps the spring plates 8; cantilever-mounted at an acute angle which ensures self-locking of the bar stock 7 in the direction of its feed, and form a fixed self-locking grip.

Free-mounted on the bushing 5 is an axially-movable sleeve 9. A bushing 11 fastened by a nut 10 on the sleeve 9 clamps the spring plates 12 cantilever-mounted at an acute angle ensuring self-locking of the bar stock 7 in the direction of its feed, said plates 12 forming a movable self-locking grip. A supporting calibrated bushing 13 secured to the face of the guide mandrel 4 which is directed towards the cutting mechanism 2 has a hole whose profile corresponds to that of the bar stock 7 being cut.

The opposite end of the guide mandrel 4 mounts a spring 14 of the working feed stroke and a nut 15 adjusting the force of said spring 14.

The bar stock 7 lies freely inside the guide mandrel 4.

The return motion of the sleeve 9, bushing 11 and plates 12 is ensured by the cam 16 via the lever 17.

The shaft 18 of the cutting mechanism 2 is installed in the bearings (not shown) of the body 19 and carries a faceplate 20. The guides of the faceplate 20 accommodate a slide 21 with a cutter 22.

The radial movement of the slide 21 is ensured by the cam 23 via the lever 24, bushing 25 and lever 26.

The shaft 18 of the cutting mechanism 2 is belt driven by an electric motor (not shown).

The camshaft 27 rotates in bearings 28 and 29. The housing of the bearing 29 has an adjusting micrometer screw 30 with a stop 31 and handwheel 32.

The camshaft 27 is belt-driven by an electric motor (not shown).

The device for cutting elastic bar stock into specified lengths functions as follows.

At the beginning of the cycle the bar stock 7 is inserted into the guide mandrel 4 so that its end is located in the plane of the blade of the cutter 22 and the spring 14 is cocked by the cam 16.

After starting the device, i.e., after setting in rotation the shaft 18 with the faceplate 20 and the camshaft 27 and on turning of the cam 16, the spring plates 12 with the sleeve 9 and bushing 11 are moved by spring 14 in the direction of feed of the bar stock 7 until the end of the lever 17 comes to bear against the stop 31. As a result, the spring plates 12 clamping the bar stock 7 feed it through a distance equal to the length of the article to be cut.

Owing to the fact that the spring plates 12 of the movable grip are located after the spring plates 8 of the fixed grip in the direction of feed of the bar stock 7, this prevents deformation of said bar stock 7 and ensures the accuracy of the feed.

Then the cutter 22 is moved radially towards the center by the cam 23 via the lever 24, bushing 25 and lever 26, and cuts off the article.

During the return motion of the spring plates 12 of the movable grip, said plates 12 actuated by the cam 16 and lever 17 slide over the bar stock 7 which is kept against movement by the spring plates 8 of the fixed grip.

The subsequent feed of the bar stock 7 for cutting is carried out when the cutter 22 is withdrawn.

The synchronism of the feed of the bar stock 7 and its cutting by the cutter 22 is ensured by the cams 16 and 23 installed on the common shaft at a certain angle to each other.

The travel of the movable grip, i.e., the feed of the bar stock is adjusted by moving the stop 31 which is done by rotating the micrometer screw 30. For convenience of rotation, the micrometer screw 30 is provided with a handwheel 32.

The advantages of the claimed device consist in the simplicity of its design, compactness, high accuracy of feed adjustment and in the possibility of adjusting the feed without stopping the device.

The claimed design of the device provides for the installation of two parallel feed and cutting mechanisms with a common drive of the cutting mechanisms and a single camshaft.

What is claimed is:

1. A device for cutting elastic bar stock into specified lengths comprising: a cutting mechanism; a cutter of said cutting mechanism; a drive for moving said cutter around the axis of the bar stock to be cut and reciprocating it towards the center of said bar stock; a feed mechanism for feeding the bar stock; a guide mandrel of said feed mechanism; a hole in said guide mandrel for said bar stock to be cut; cantilever-mounted spring plates, immovable with relation to said guide mandrel and constituting a fixed grip; cantilever-mounted spring plates, with a provision for moving along said guide mandrel and constituting a movable grip; free ends of said spring plates intended to clamp said bar stock, said plates being directed at an acute angle towards said bar stock, said angle ensuring self-locking of said bar stock in the direction opposite to its feed; a drive for reciprocating said spring plates of said movable grip in the direction of feed.

2. A device according to claim 1 wherein said spring plates of said movable grip are located after said plates of said fixed grip in the direction of feed of said bar stock.

3. A device according to claim 1 wherein said drive for reciprocating said movable grip is provided with a regulator for adjusting the travel of said movable grip.

* * * * *